(12) United States Patent
Wennstrom

(10) Patent No.: US 8,238,225 B2
(45) Date of Patent: Aug. 7, 2012

(54) METHOD AND SYSTEM OF MANAGING CONTROL INFORMATION

(75) Inventor: Mattias Wennstrom, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 375 days.

(21) Appl. No.: 12/605,462

(22) Filed: Oct. 26, 2009

(65) Prior Publication Data

US 2010/0046461 A1    Feb. 25, 2010

Related U.S. Application Data

(63) Continuation of application No. PCT/CN2007/001454, filed on Apr. 29, 2007.

(51) Int. Cl.
*H04J 11/00* (2006.01)
*H04J 9/00* (2006.01)
*H04W 4/00* (2009.01)
*H04B 7/208* (2006.01)

(52) U.S. Cl. ......... 370/203; 370/204; 370/329; 370/344
(58) Field of Classification Search .................. 370/329, 370/344, 208–209
See application file for complete search history.

(56) References Cited

U.S. PATENT DOCUMENTS

| | | | |
|---|---|---|---|
| 7,961,807 B2 * | 6/2011 | Kotecha et al. | 375/267 |
| 2005/0286663 A1 | 12/2005 | Poon | |
| 2006/0209980 A1 * | 9/2006 | Kim et al. | 375/267 |
| 2007/0042720 A1 | 2/2007 | Pan et al. | |
| 2007/0049218 A1 * | 3/2007 | Gorokhov et al. | 455/102 |
| 2007/0053460 A1 | 3/2007 | Ashikhmin | |
| 2007/0191066 A1 * | 8/2007 | Khojastepour et al. | 455/562.1 |
| 2008/0227495 A1 * | 9/2008 | Kotecha et al. | 455/562.1 |
| 2011/0032839 A1 * | 2/2011 | Chen et al. | 370/252 |
| 2011/0255632 A1 * | 10/2011 | Khojastepour et al. | 375/295 |
| 2012/0039411 A1 * | 2/2012 | Khojastepour et al. | 375/267 |
| 2012/0057558 A1 * | 3/2012 | Prasad et al. | 370/329 |

FOREIGN PATENT DOCUMENTS

| | | |
|---|---|---|
| WO | WO 2006/007148 A1 | 1/2006 |
| WO | WO 2006/049417 A1 | 5/2006 |
| WO | WO 2007/036073 A1 | 4/2007 |

OTHER PUBLICATIONS

Written Opinion of the International Searching Authority in corresponding PCT Application No. PCT/CN2007/001454 (Feb. 14, 2008).

(Continued)

*Primary Examiner* — Chi Pham
*Assistant Examiner* — Farah Faroul

(57) ABSTRACT

The present disclosure relates to the management of control information in a multi-user multi-input multi-output system with a base unit and two or more user units, where respective user unit sends an index representing a vector from a user codebook belonging to the user unit. The base unit co-schedules compatible user units to simultaneously share one time-frequency resource by selecting a precoding matrix from a base unit codebook based on the indices received from co-scheduled user units, according to a predefined function. The base unit transmits control information regarding selected precoding matrix to each co-scheduled user unit. The predefined function is known to each user unit and the control information to each user unit only contains information on the index from every other user unit.

20 Claims, 1 Drawing Sheet

OTHER PUBLICATIONS

International Search Report in corresponding PCT Application No. PCT/CN2007/001454 (Feb. 14, 2008).

"R1-071569—Downlink signaling for support of single-user MIMO," 3GPP TSG RAN WG1 Meeting #48bis, Mar. 26-30, 2007, Samsung, St. Julian's, Malta.

Yoo, "On the Optimality of Multiantenna Broadcast Scheduling Using Zero-Forcing Beamforming," IEEE Journal on Selected Areas in Communications, vol. 24, No. 3, pp. 528-541 (Mar. 2006).

Philips, "Performance of LTE DL MU-MIMO with Dedicated Pilots," *3GPP Technical Specification Group RAN WG1 Meeting #48bis*, Tdoc R1-071403: 1-5 (Mar. 2007).

Samsumg, "Downlink MIMO for EUTRA," *3GPP Technical Specification Group RAN GW1 Meeting #44*, R1-060335: 1-10 (Feb. 2006).

\* cited by examiner

METHOD AND SYSTEM OF MANAGING CONTROL INFORMATION

This application is a continuation of International Patent Application No. PCT/CN2007/001454, filed Apr. 29, 2007, which is hereby incorporated by reference in its entirety.

FIELD OF THE TECHNOLOGY

The present disclosure relates to a method of managing control information in a multi-user multi-input, multi-output system.

The present disclosure also relates to a multi-user multi-input multi-output system, different units belonging to such a system, and to various computer program elements whereby an inventive method or inventive units can be realized.

BACKGROUND OF THE DISCLOSURE

In a multiple-input, multiple-output (MIMO) communication system using wireless orthogonal frequency division multiplexing (OFDM), the use of multiple antennas is much preferred in order to increase the performance of the system. When multiple antenna transmission at the transmitter side, either the base station or the mobile station, is used, then the space dimension can be exploited for scheduling of the transmission to the different users in the system.

To increase the throughput of the cell, an OFDM time-frequency resource can simultaneously be shared by multiple users. This is described in publications "Philips, 3GPP Technical document R1-071403", "Samsung, 3GPP Technical document R1-060335", "On the optimality of multiantenna broadcast scheduling using zero forcing beamforming" by T. Yoo and A. Goldsmith, IEEE journal on selected areas in communications, Vol. 24, No. 3, March 2006, pp. 528-541.

When two or more users share the same time-frequency resource, the transmissions to the co-scheduled users will mutually interfere with each other at the receiver side.

To minimize this interference between the co-scheduled users, precoding at the base station is performed in form of a linear mapping of each users signal to the transmitter antennas. This linear mapping is easily described by a matrix multiplication, where a precoding matrix, is jointly selected by the scheduled mobile users to minimize the mutual interference. Hence, precoded MU-MIMO is a closed loop MIMO scheme where the transmission is adjusted based on the channel to the co-scheduled mobile users.

In more detail, each mobile user selects a channel quantization vector (CQV) from a finite mobile user codebook of precoding vectors. The CQV is a quantization of the estimated channel vector from the $N_T$ base station transmitter antennas to the receiver antenna at the mobile user. If the mobile user has multiple receive antennas, the mobile user can find a receiver filter to combine the multiple receive antennas to obtain a virtual single antenna. The CQV is then estimated as the channel from the $N_T$ base station transmitter antennas to the single virtual receive antenna, i.e. after receiver filtering.

The selected CQV from the mobile user codebook is signalled to the base station. The scheduler in the base station then determines which mobile users are to be co-scheduled in an OFDM time frequency resource and selects the precoding matrix based on the reported CQV from these users.

For correct reception and demodulation of the transmitted signals, the mobile users need to have knowledge of the used transmitter precoding matrix and this information needs to be signalled to the mobile users.

Furthermore, knowledge of the full precoding matrix at the mobile user enables the use of interference suppression algorithms to minimize the residual interference from co-scheduled mobile users.

In "Philips, 3GPP Technical document R1-071403", a method to solve the large signalling overhead problem is discussed where it is suggested to use dedicated precoded reference signals, one set of reference signals per scheduled mobile user. The overhead of this method is compared with the overhead of signalling the used base station precoding matrix index. However, no attempt was made in the comparison to reduce the signalling overhead in the downlink from the upper limit value of $\log_2(K^L)$ bits where K is the user codebook size and L is the number of co-scheduled users.

One problem with MU-MIMO signalling lies in the overhead of signalling the used precoding matrix at the base station transmitter to all the scheduled mobile users. If L mobile users are scheduled together in a mutual OFDM time-frequency resource, and there is a one-to-one correspondence between the selected vectors in the mobile user codebook and the selected base station precoding matrix, then there are $K^L$ possible base station transmitter precoding matrices where K is the number of vectors in the mobile user codebook. To signal the used transmitter precoding matrix in the downlink, $L \cdot \log_2(K)$ bits are needed, which generally is too large to be practical.

SUMMARY OF THE DISCLOSURE

In present disclosure the predefined function is known to each user unit, the control information to each user unit only contains information on the index from every other user unit, and respective user unit regenerates the precoding matrix according to its own index, other user units' indices and the predefined function.

Since the base unit must have used the index of the user unit in the construction of the precoding matrix, the user unit has a prior knowledge of how the precoding matrix is constructed and this need not to be re-confirmed; only the residual information needs to be signalled to user unit. This will limit the required number of bits to represent the precoding matrix in the control message from $L \cdot \log_2(K)$ bits to $(L-1) \cdot \log_2(K)$ bits, which is a significant reduction of the control signalling. The index from the user codebook could for instance correspond to a requested channel quantization vector.

In one embodiment of the present disclosure the base unit and respective user unit agree on forbidden combinations of indices from co-scheduled user units and take these forbidden combinations into consideration when selecting/regenerating the precoding matrix. Defined forbidden combinations of indices limits the possible amount of precoding matrices and thus limits the number of bits required to represent all possible precoding matrices to $(L-1) \cdot \log_2(S)$ bits where S<K.

One proposed way of deciding on forbidden combinations is to have the base unit and respective user units to agree on a real-valued positive threshold (T), where a first user unit (A) and a second user unit (B) is only allowed to be co-scheduled if their respective indices represent vectors $(\bar{u}_a, \bar{u}_b)$ that fulfils the condition $|\bar{u}_a^* \bar{u}_b| \leq T$.

There are different functions that can be used to create the precoding matrix and one proposed predefined function is the Zero Forcing precoder, which for L co-scheduled user units can be written as:

$$f(\bar{H}) = \bar{H}(\bar{H}^*\bar{H})^{-1} \text{ where } \bar{H} = [\bar{x}_1 \bar{x}_2 \ldots \bar{x}_L]$$

and the output of the function $f$ is a $N_T$ by L precoding matrix.

If a user unit is not co-scheduled with another user unit, then the base unit transmits a single stream and indicates this in the control information to the user unit. It is also taught that if the least amount of bits required to represent the possible amount of precoding matrices has at least one free bit combination, then it is possible to allow one bit combination to represent single stream transmission.

In a method, system, a base unit, a user unit and a computer program element according to the present disclosure, less number of bits are required to represent the used precoding matrix in the control messages form the base unit to the user units. This will significantly reduce the signalling overhead for MU-MIMO communication systems.

BRIEF DESCRIPTION OF THE DRAWINGS

A method, a system, units and various computer program elements according to the present disclosure will now be described in detail with reference to the accompanying drawings, in which.

DETAILED DESCRIPTION OF THE DISCLOSURE

Figure 1:
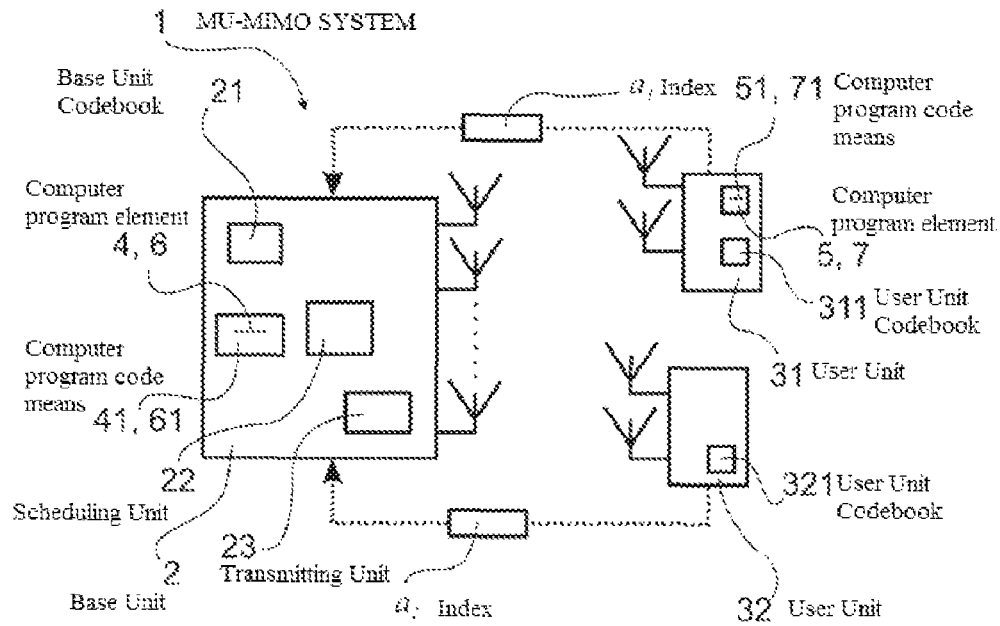
FIG. 1 is a schematic and simplified illustration of a MU-MIMO system where indices are sent from the user units to the base unit.

An inventive method of managing control information will now be described with reference to FIG. 1 showing in a multi-user multi-input, multi-output (MU-MIMO) system 1 with one base unit 2 and one or several user units 31, 32, where the base unit has $N_T$ antennas. The user units 31, 32 are for instance mobile telephones or other mobile communication units present within a cell serviced by the base unit 2. A user unit may also be any stationary unit that uses the MU-MIMO system for communication.

Respective user unit 31 sends an index a1 representing a vector $\bar{u}$ from a user codebook 311 belonging to the user unit 31.

Respective user unit 32 sends an index a2 representing a vector $\bar{u}$ from a user codebook 321 belonging to the user unit 32.

A user codebook, e.g. 311, 321, can be defined consisting of K vectors $$U_{N_T} = \{\bar{u}_k\}_{k=1}^{K}$$

and each user unit 31, 32 reports its preferred vector $\bar{u}$ through their respective index $a_1, a_2$.

Assume that L users are MU-MIMO co-scheduled which have reported indices $a_1, a_2, \ldots, a_L$ from the user codebooks, e.g. 311, 321, where $1 \leq a_l \leq K$, $l=1, 2, \ldots, L$. It is well known that users which have reported the same user unit codebook index can not be MU-MIMO co-scheduled together since it makes user separation with linear receiver impossible, so all $a_l$ are unique. Without loss of generality, rearrange the user indices and define a new set as $a_1, \ldots, a_L$ such that $1 \leq a_1 < a_2 < \ldots \leq K$.

Similar to the user codebook, e.g. 311, 321, a base unit codebook 21 is defined as $$\Psi_{N_T,L} = \{W_p\}_{p=1}^{P}$$

where each precoding matrix $W_p$ is a $N_T \cdot L$ matrix. The size of the codebook 21 is generally much larger than the user codebook, e.g., 311, 321. The precoding matrix used at the base unit is a function of the selected user unit codebook vectors, hence $$W_p = f(\bar{u}_{a_1}, \ldots, \bar{u}_{a_L})$$

where the function $f$ is a unique mapping function from the set of vectors indicated by the scheduled user unit codebook indices $a_1, \ldots, a_L$. The unique mapping between the subset of user unit codebook indices $a_1, \ldots, a_L$ and a base unit codebook index p can be defined as $p = I(a_1, \ldots, a_L)$.

The mapping assures that for each subset $a_1, \ldots, a_L$ one and only one base unit codebook index p is defined.

The mapping also assures that for each base unit codebook index p, one and only one subset $a_1, \ldots, a_L$ is defined.

Each of the allowed combinations $a_1, \ldots, a_L$ gives a unique base unit codebook index p and thus define the base unit codebook.

Furthermore, for some particular sets $a_1, \ldots, a_L$, no precoding matrix is defined, thereby the particular $a_1, \ldots, a_L$ is in this case a forbidden selection. The forbidden selections of $a_1, \ldots, a_L$ are known in the system to both the transmitter and the receivers. For instance, we have already introduced the forbidden selection $a_1 = a_2 = \ldots = a_L$ above.

As described above, the base unit 2 co-schedules compatible user units 31, 32 to simultaneously share one time-frequency resource, and in doing so the base unit 2 selects a precoding matrix from the base unit codebook based on the indices $a_1, a_2$ received from co-scheduled user units, the selection being made according to a predefined function $f$.

Figure 2:
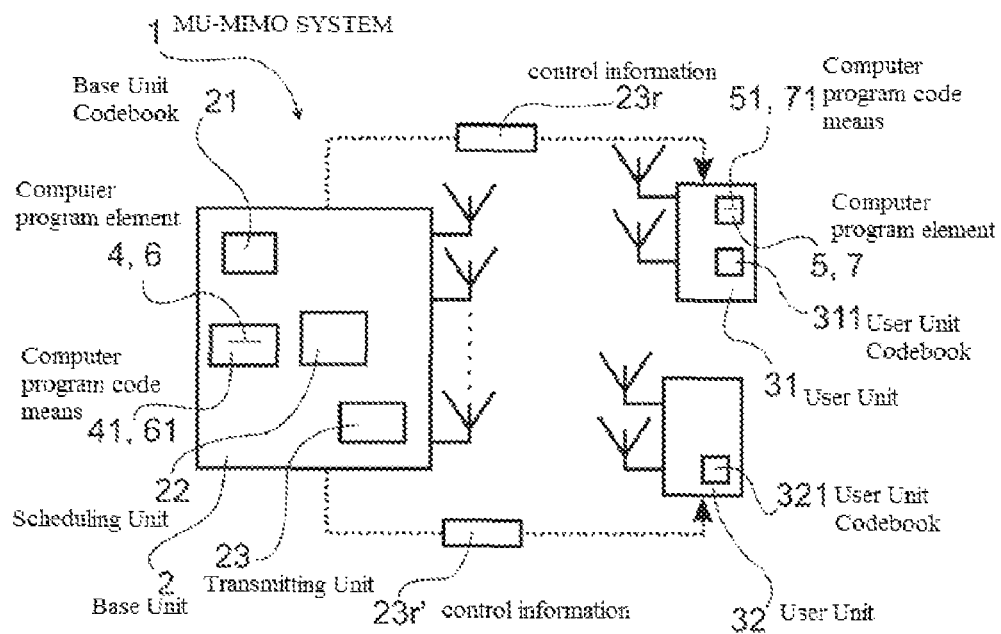
FIG. 2 is a schematic and simplified illustration of a MU-MIMO system where control information is sent from the base unit to the user units.

FIG. 2 shows that the base unit 2 transmits control information regarding selected precoding matrix to each co-scheduled user unit 31, 32.

The control signalling is to indicate to each scheduled user unit, which precoding matrix from the base unit codebook is used. Since the size of the base unit codebook 21 is P matrices, $\log_2(P)$ bits are needed for this control signalling, and in conventional art the same message is sent to each user.

However, the present disclosure is to reduce this overhead. The disclosure relies in that each scheduled user unit get residual information only, that is, only new information. Therefore, the message 23r, 23r' to each user unit will be different.

For a certain user A, which has reported a user unit codebook index $a_A$, there exists an ordered subset of the base unit codebook 21. This subset can be described as $\{Wb_1 \; Wb_2 \ldots Wb_Q\}$.

The subset can be identified using the Q indices to the base unit codebook $$b_q = I(a_1, \ldots, a_A, \ldots, a_L) \quad q=1, \ldots, Q$$

Therefore, for each user unit codebook vector defined by an index a, there exists a subset of base unit codebook indices as $$B_a = \{b_1^{(a)} \ldots b_Q^{(a)}\}.$$

So, when a user unit has selected a vector a in the user unit codebook, it knows, that if it is scheduled, the base unit precoding matrix will have an index belonging to $B_a$. This fact is the key which is used to reduce the control signalling, since it is only necessary to inform this user which of the indices in $B_a$ is used.

The number Q and the subsets $B_a$ are determined by obeying the restrictions

The subset $a_1, \ldots, a_L$ must contain a

The subset $a_1, \ldots, a_L$ must not be a forbidden selection.

When the used base unit precoding matrix is signalled to user unit 31, only the index q from the ordered $B_a = \{b_1^{(a)} \ldots$ $b_Q^{(a)}\}$, q=1, ..., Q needs to be signalled and thus $\log_2(Q)$ bits needs to be signalled to the user unit 31. The procedure is repeated for the other user unit 32 and $\log_2(Q)$ bits are thus also signalled to the user unit 32, however, the bits to the user unit 31 is different to those to the user unit 32.

Since the predefined function $f$ is known to each user unit 31, 32 it is thus enough that the control information to each user unit, for example user unit 31 only contains information on the index $a_2$ from every other user unit 32. This enables respective user unit to regenerate the precoding matrix Wp according to its own index $a_1$, other user units indices $a_2$ and the predefined function $f$.

It is proposed that the index from the user codebook 311 corresponds to a requested channel quantization vector (CQV).

To reduce the signalling even more it is proposed that the base unit 21 and respective user unit 31, 32 agree on forbidden combinations of indices from co-scheduled user units and takes these forbidden combinations into consideration when regenerating the precoding matrix.

One way of using forbidden combinations of indices is to introduce a restriction on the relation between reported user unit codebook vectors in a co-scheduled resource, i.e., forbidden selections of user codebook indices are introduced. If a first user unit 31, A and a second user unit 32, B are co-scheduled and the first user unit A has reported the vector $\bar{u}_a$ from the user codebook 311 and the second user unit B has reported $\bar{u}_b$, the restriction could be that the two user units A, B can only be co-scheduled in a time-frequency resource if $|\bar{u}_a^*\bar{u}_b| \leq T$ where T is a real-valued positive threshold known in the system. With this restriction, the size of the base unit codebook 21 is reduced and it will also impact the number Q above.

A practical example of the present disclosure will now be disclosed. A user unit codebook 311 consisting of CQVs is defined. Also a base unit codebook 21 consisting of precoding matrices is defined. Each co-scheduled user unit has reported an index corresponding to a vector in the user unit codebook 311. A scheduling unit 22, belonging to the base unit 2, selects L users and finds the matrix p in the base unit codebook by $p=I(a_1, \ldots, a_L)$. To signal the selection p to the L scheduled users, L individual control messages are assembled as follows. To a first user unit which has reported user codebook index $a_A$ the set $$B_{a_A} = \{b_1^{(a_A)} \ldots b_Q^{(a_A)}\}$$

is generated where $$b_q^{(a_A)} = I(a_1, \ldots, a_A, \ldots a_L)$$

for all allowed combinations of $\{a_1, \ldots, a_L\}$ which includes $a_A$. The first user unit A is thus signalled the position number q in $B_a$ where $$b_q^{(a_A)} = p$$

Since the first user unit knows $a_A$, and that the subset of indices $a_1, \ldots, a_L$ are ordered such that $1 \leq a_1 < a_2 < \ldots < a_L \leq K$; it can generate $B_a$ and from q it can obtain p. Also, from the ordering $a_1, \ldots, a_L$, the first user unit A gets information on which of the columns of the precoding matrix p is intended for the first user unit A.

Assume that the number of transmitter antennas $N_T$ is 4 at the base unit, that the user unit codebook size is K=16 and L=2 user units that are possible to MU-MIMO co-schedule. In total, there are $16^2=256$ "possible" precoding matrices which then will require 8 bits to signal to the two user units which precoding matrix is used.

Assume a threshold of T=0.25 to introduce forbidden selections of indices. This gives P=56 allowed precoding matrices assuming a Discrete Fourier Transform mobile user codebook according to "Samsung, 3GPP Technical document R1-060335" and by a method which indicates which one of the allowed base unit precoding matrices is used, the required signalling is 6 bits.

The signalling can be reduced further according to the present disclosure by only signalling the uplink reported user unit codebook index of the MU-MIMO co-scheduled users. Due to the forbidden selections of indices, for each particular vector $\bar{u}_a$ there are only Q=7 "allowed" vectors $\bar{u}_b$ that can be paired with $\bar{u}_a$. Therefore, only 3 bits needs to be signalled.

For the example above, the mapping p=I(a,b) is given in table 1.

TABLE 1

Example mapping between base unit codebook index p = I(a, b) and user unit codebook indices a, b.

| I(a, b) | a | b |
|---|---|---|
| 1 | 1 | 2 |
| 2 | 1 | 3 |
| 3 | 1 | 4 |
| 4 | 1 | 6 |
| 5 | 1 | 7 |
| 6 | 1 | 14 |
| 7 | 1 | 15 |
| 8 | 2 | 3 |
| 9 | 2 | 4 |
| 10 | 2 | 7 |
| 11 | 2 | 8 |
| 12 | 2 | 15 |
| 13 | 2 | 16 |
| 14 | 3 | 4 |
| 15 | 3 | 5 |
| 16 | 3 | 8 |
| 17 | 3 | 13 |
| 18 | 3 | 16 |
| 19 | 4 | 5 |
| 20 | 4 | 6 |
| 21 | 4 | 13 |
| 22 | 4 | 14 |
| 23 | 5 | 6 |
| 24 | 5 | 7 |
| 25 | 5 | 8 |
| 26 | 5 | 10 |
| 27 | 5 | 11 |
| 28 | 6 | 7 |
| 29 | 6 | 8 |
| 30 | 6 | 11 |
| 31 | 6 | 12 |
| 32 | 7 | 8 |
| 33 | 7 | 9 |
| 34 | 7 | 12 |
| 35 | 8 | 9 |
| 36 | 8 | 10 |
| 37 | 9 | 10 |
| 38 | 9 | 11 |
| 39 | 9 | 12 |
| 40 | 9 | 14 |
| 41 | 9 | 15 |
| 42 | 10 | 11 |
| 43 | 10 | 12 |
| 44 | 10 | 15 |
| 45 | 10 | 16 |
| 46 | 11 | 12 |
| 47 | 11 | 13 |
| 48 | 11 | 16 |
| 49 | 12 | 13 |
| 50 | 12 | 14 |
| 51 | 13 | 14 |
| 52 | 13 | 15 |

TABLE 1-continued

Example mapping between base unit
codebook index p = I(a, b) and user unit codebook indices a, b.

| I(a, b) | a | b |
|---|---|---|
| 53 | 13 | 16 |
| 54 | 14 | 15 |
| 55 | 14 | 16 |
| 56 | 15 | 16 |

Furthermore, for the control signalling, for each selection of user unit codebook index a, there exists a table of the possible co-scheduled vectors b, defined as $C_a$ and shown for this example and the cases a=1 and b=14 in table 2 below. These sets are easily derived from table 1.

TABLE 2

The sets of $C_1$ and $C_{14}$

| The set C1 | | The set C14 | |
|---|---|---|---|
| r | b | r | a |
| 1 | 2 | 1 | 1 |
| 2 | 3 | 2 | 4 |
| 3 | 4 | 3 | 9 |
| 4 | 6 | 4 | 12 |
| 5 | 7 | 5 | 13 |
| 6 | 14 | 6 | 15 |
| 7 | 15 | 7 | 16 |
| 8 | — | 8 | — |

If the first user unit A has reported a user unit codebook index a=1 and it is MU-MIMO co-scheduled with a second user unit B which has reported b=14, then from table 1, p=I(1, 14)=6 is the index of the used base unit precoding matrix. It is regenerated as $W_6 f(\bar{u}_1, \bar{u}_{14})$.

Furthermore, since the first user unit A signalled a=1 in the uplink it knows that C1 will be used when indicating the used precoding matrix so r=6 is signalled in the downlink and the user first unit is thereby informed that its co-scheduled user has b=14. It can thereby deduce the index to the precoder as p=I(1, 14)=6. Since it has the lowest reported user codebook index of the two co-scheduled users units, it knows that the first column of W6 is the precoding vector for the first user unit A.

To the second user unit B, which has signalled b=14, r=1 is signalled in the downlink, hence, from C14, it know that it has been co-scheduled with a user unit which has reported a=1. The second user unit B then orders the pair according to a<b and finds the index to the precoder as p=I(1, 14)=6. Also, since it has the higher reported user codebook index of the two co-scheduled user units, it knows that the second column of W6 is the precoding vector for the second user unit B.

The example above shows one way of sending information on the index from every other user unit, which is to send the index r for the other user unit, whereby it is possible to recreate the precoding matrix.

Another example using table 1 above shows that the information from the base unit to each user unit could be to send the index p, where p=I(a,b). Using the same selections as in the example above with the cases a=1 and b=14, a table 3 shows possible matrices p depending on selection a, b would then be:

TABLE 3

The sets of $b_r^1$ and $b_r^{14}$

| The set $B_1$ | | The set $B_{14}$ | |
|---|---|---|---|
| r | $b_r^1$ | r | $b_r^{14}$ |
| 1 | 1 | 1 | 6 |
| 2 | 2 | 2 | 22 |
| 3 | 3 | 3 | 40 |
| 4 | 4 | 4 | 50 |
| 5 | 5 | 5 | 51 |
| 6 | 6 | 6 | 54 |
| 7 | 7 | 7 | 55 |
| 8 | — | 8 | — |

Furthermore, since the first user unit A signalled a=1 in the uplink it knows that B1 will be used when indicating the used precoding matrix so r=6 is signalled in the downlink and the user first unit is thereby informed that p=6=I(1, 14). It can thereby deduce that its co-scheduled user has b=14. Since it has the lowest reported user codebook index of the two co-scheduled users units, it knows that the first column of W6 is the precoding vector for the first user unit A.

To the second user unit B, which has signalled b=14, r=1 is signalled in the downlink, hence, from B14, it know that p=6=I(1, 14), and that it has been co-scheduled with a user unit which has reported a=1. Also, since it has the higher reported user codebook index of the two co-scheduled user units, it knows that the second column of W6 is the precoding vector for the second user unit B.

There are different functions f and one proposed function to use is the Zero Forcing precoder, which for L co-scheduled user units can be written as:

$f(\bar{H}) = \bar{H}(\bar{H}^*\bar{H})^{-1}$ where $\bar{H} = [\bar{x}_1 \bar{x}_2 \ldots \bar{x}_L]$ If a user unit 31 is not co-scheduled with another user unit, then the base unit 2 transmits a single stream and indicates this in the control information to the user unit 31.

If there is room in the sets $B_a = \{b_1^{(a)} \ldots b_Q^{(a)}\}$, it is possible to signal that only a single stream will be transmitted, i.e. L=1. For instance, in the example above, table 2 will in this case be modified to table 4 below.

TABLE 4

The set $C_1$

| r | $b_r^{(1)}$ |
|---|---|
| 1 | 2 |
| 2 | 3 |
| 3 | 4 |
| 4 | 6 |
| 5 | 7 |
| 6 | 14 |
| 7 | 15 |
| 8 | Single Stream |

With reference to FIG. 1, an inventive multi-user multi-input, multi-output system 1 will now be described. The system comprises one base unit 2 and one or several user units 31, 32, where respective user unit 31, 32 is adapted to send an index $a_1$, $a_2$ representing a vector from a user codebook 311, 312 belonging to the user unit 31, 32.

A scheduling unit 22, belonging to the base unit 2, is adapted to co-schedule compatible user units 31, 32 to simultaneously share one time-frequency recourse, where the base unit 2 is adapted to select a precoding matrix from a base unit codebook 21 based on the indices $a_1$, $a_2$ received from co-scheduled user units 31, 32. The scheduling unit 22 is adapted to make the selection according to a predefined function.

FIG. 2 shows that a transmitting unit 23 is adapted to transmit control information 23r, 23r' regarding selected precoding matrix to each co-scheduled user unit 31, 32.

The predefined function is known to each user unit 31, 32, that the control information 23r, 23r' to each user unit only contains information on the indices from every other user unit, and that respective user unit is adapted to regenerate the precoding matrix according to its own index, other user units indices and the predefined function.

It is proposed that the index $a_1$, $a_2$ from the user codebook corresponds to a requested channel quantization vector (CQV).

It is also proposed that the base unit 2 and respective user unit 31, 32 are adapted to take agreed forbidden combinations of indices from co-scheduled user units into consideration when selecting/regenerating the precoding matrix.

One way of agreeing to forbidden combinations is that the base unit and respective user unit are adapted to agree on a real-valued positive threshold T, and that the scheduling unit is adapted to co-schedule a first user unit A and a second user unit B only if their respective indices represents vectors $\bar{u}_a, \bar{u}_b$ that fulfils the condition $|\bar{u}_a * \bar{u}_b| \leq T$.

The scheduling unit and respective user unit can be adapted to use the Zero Forcing precoder as a predefined function, which for L co-scheduled user units can be written as:

$$f(\overline{H}) = \overline{H}(\overline{H}*\overline{H})^{-1} \text{ where } \overline{H} = [\bar{x}_1 \bar{x}_2 \ldots \bar{x}_L]$$

It is also proposed that if a user unit 31 is not co-scheduled with another user unit, then the base unit 2 is adapted to transmit a single stream and to indicate this in the control information to the user unit 31.

The present disclosure also relates to a base unit 2 adapted to communicate with one or several user units 31, 32 in a multi-user multi-input multi-output system 1, where the base unit 2 is adapted to receive, from each user unit 31, 32 an index $a_1$, $a_2$ representing a vector from a user codebook belonging to respective user unit 31, 32.

A scheduling unit 22, belonging to the base unit 2, is adapted to co-schedule compatible user units 31, 32 to simultaneously share one time-frequency recourse, where the scheduling unit 22 is adapted to select a precoding matrix from a base unit codebook 21 based on received indices from co-scheduled user units. The scheduling unit 21 is adapted to make the selection according to a predefined function.

A transmitting unit 23, belonging to the base unit 2, is adapted to transmit control information 23r, 23r' regarding selected precoding matrix to each co-scheduled user unit 31, 32.

The control information 12r, 12r' to each user unit only contains information on indices from every other user unit.

It is proposed that the index from respective user unit corresponds to a requested channel quantization vector (CQV).

An inventive base unit 2 can be adapted to take agreed forbidden combinations of indices from co-scheduled user units 31, 32 into consideration when selecting the precoding matrix.

Such an agreement could be that the scheduling unit 22 is adapted to co-schedule a first user unit A and a second user unit B only if their respective indices related to vectors $(\bar{u}_a, \bar{u}_b)$ that fulfils the condition $|\bar{u}_a * \bar{u}_b| \leq T$, where T is a real-valued positive threshold.

It is proposed that the scheduling unit 22 is adapted to use the Zero Forcing precoder as the predefined function, which for L co-scheduled user units can be written as:

$$f(\overline{H}) = \overline{H}(\overline{H}*\overline{H})^{-1} \text{ where } \overline{H} = [\bar{x}_1 \bar{x}_2 \ldots \bar{x}_L]$$

If a user unit is not co-scheduled with another user unit, then the base unit is adapted to transmit a single stream and to indicate this in the control information to the user unit.

The present disclosure also relates to an inventive user unit 31 adapted to communicate with a base unit 2 in a multi-user multi-input multi-output system 1, where the user unit 31 is adapted send an index $a_1$ to the base unit, the index representing a vector coming from a user codebook 311 belonging to the user unit 31.

The user unit 31 is adapted to receive control information 23r regarding a selected precoding matrix related to possibly other co-scheduled user units 32 from the base unit 2.

A predefined function used by the base unit 2 to select the precoding matrix is known to the user unit 31, and that the control information only contains information on indices $a_2$ from other co-scheduled user units 32.

The user unit 31 is adapted to regenerate the precoding matrix according to its own index $a_1$, other user units indices $a_2$ and the predefined function.

It is proposed that the index corresponds to a channel quantification vector, CQV, and that the user unit 31 is adapted to make a request of a desired channel quantization vector by sending the index $a_1$ to the base unit 2.

It is also proposed that the user unit 31 is adapted to take agreed forbidden combinations of indices from other co-scheduled user units into consideration when regenerating the precoding matrix. One way of realising this is to adapt the user unit 31 to take a real-valued positive threshold T into consideration when regenerating the precoding matrix, the threshold representing a value where a first user unit A and a second user unit B is only allowed to be co-scheduled if their respective indices represents vectors $\bar{u}_a, \bar{u}_b$ that fulfils the condition $|\bar{u}_a * \bar{u}_b| \leq T$.

The user unit 31 may be adapted to use the Zero Forcing precoder as predefined function, which for L co-scheduled user units can be written as:

$$f(\overline{H}) = \overline{H}(\overline{H}*\overline{H})^{-1} \text{ where } \overline{H} = [\bar{x}_1 \bar{x}_2 \ldots \bar{x}_L]$$

It is also proposed that if the control information indicates that the user unit 31 is not co-scheduled with another user unit, then the user unit 31 is adapted to communicate with the base unit 2 through a single stream.

The present disclosure also relates to a number of different computer program elements.

One inventive computer program element 4 comprises computer program code means 41 to make a computer unit execute the steps of a base unit 2 according to the inventive method.

Another inventive computer program element 5 comprises computer program code means 51 to make a computer unit execute the steps of a user unit 31 according to the inventive method.

Another computer program element 6 comprises computer program code means 61 which when executed by a computer unit enables the computer unit to function as an inventive base unit 2.

Another computer program element 7 comprises computer program code means 71 which when executed by a computer unit enables the computer unit to function as an inventive user unit 31.

It will be understood that the invention is not restricted to the aforedescribed and illustrated exemplifying embodiments

The invention claimed is:

1. A method of managing control information, comprising:
co-scheduling, by a base unit, two or more user units to share a time-frequency resource;
selecting, by the base unit, a precoding matrix from a codebook of the base unit according to a predefined function based on indices received from the co-scheduled user units; and
transmitting, by the base unit, control information regarding the precoding matrix to each of the co-scheduled user units, wherein
each index of the indices representing a vector in a codebook of each of the co-scheduled user units,
the predefined function is known to each of the co-scheduled user unit, and
the control information transmitted to each of the co-scheduled user units only contains information of the index from every other user unit of each of the co-scheduled user units.

2. The method according to claim 1, wherein the precoding matrix is regenerated by a user unit of the co-scheduled user units according to an index of the user unit, the control information received by the user unit and the predefined function.

3. The method according to claim 1, wherein each index of the indices corresponds to a requested channel quantization vector (CQV).

4. The method according to claim 1, wherein the precoding matrix is selected by excluding a forbidden combination of indices from the co-scheduled user units, and the forbidden combination is agreed on by the base unit and the co-scheduled user units.

5. The method according to claim 1, wherein the precoding matrix is regenerated by a user unit of the co-scheduled user units by taking a forbidden combination of indices from the co-scheduled user units into consideration, and the forbidden combination is agreed on by the base unit and the co-scheduled user units.

6. The method according to claim 1, wherein a first user unit and a second user unit of the co-scheduled user units are co-scheduled if their respective vectors, $\bar{u}_a$ and $\bar{u}_b$, represented by their respective indices received by the base unit, meet the condition of $|\bar{u}_a * \bar{u}_b| \leq T$, where T is a real-valued positive threshold.

7. The method according to claim 1, further comprising:
transmitting a single stream to a user unit indicating that the user unit is not co-scheduled with another user unit.

8. A base unit, comprising:
a scheduling unit, used for co-scheduling two or more user units to share a time-frequency resource, and selecting a precoding matrix from a codebook of the base unit according to a predefined function based on indices received from the co-scheduled user units; and
a transmitting unit, used for transmitting control information regarding the precoding matrix to each of the co-scheduled user units, wherein each index of the indices representing a vector in a codebook of each of the co-scheduled user units, and the control information transmitted to each of the co-scheduled user units only contains information of the index from every other user unit of each of the co-scheduled user units.

9. The base unit according to claim 8, wherein the precoding matrix is selected by excluding a forbidden combination of indices from the co-scheduled user units, and the forbidden combination is agreed on by the base unit and the co-scheduled user units.

10. The base unit according to claim 8, wherein a first user unit and a second user unit of the co-scheduled user units are co-scheduled if their respective vectors, $\bar{u}_a$ and $\bar{u}_b$, represented by their respective indices received by the base unit, meet the condition of $|\bar{u}_a * \bar{u}_b| \leq T$, where T is a real-valued positive threshold.

11. The base unit according to claim 8, wherein the transmitting unit is further used for transmitting a single stream to a user unit indicating that the user unit is not co-scheduled with another user unit.

12. A user unit, comprising:
a unit, used for sending an index to a base unit, the index representing a vector in a codebook of the user unit; and
a unit, used for receiving, from the base unit, control information regarding a precoding matrix related to a co-scheduled user unit, wherein a predefined function used by the base unit to select the precoding matrix according to the index sent by the user unit is known to the user unit, and the control information only contains information of another index sent to the base unit from the co-scheduled user unit.

13. The user unit according to claim 12, further comprising: a unit used for regenerating the precoding matrix according to the index sent by the user unit, the control information and the predefined function.

14. The user unit according to claim 12, wherein the index sent by the user unit corresponds to a channel quantification vector (CQV).

15. The user unit according to claim 13, wherein the precoding matrix is regenerated by taking a forbidden combination of indices from the user unit and the co-scheduled user unit into consideration, and the forbidden combination is agreed on by the base unit, the user unit and the co-scheduled user unit.

16. The user unit according to claim 13, wherein the user unit and the co-scheduled user unit are co-scheduled if their respective indices represent vectors, $\bar{u}_a$ and $\bar{u}_b$, represented by their respective indices received by the base unit, fulfil the condition respective vectors, $\bar{u}_a$ and $\bar{u}_b$, represented by their respective indices received by the base unit, fulfil the condition of $|\bar{u}_a * \bar{u}_b| \leq T$, where T is a real-valued positive threshold.

17. The user unit according to claim 12, wherein the unit used for receiving is further used for receiving a single stream indicating that the user unit is not co-scheduled with another user unit.

18. A system comprising: two or more user units and a base unit, wherein the base unit comprises:
a scheduling unit used for co-scheduling two or more user units to share a time-frequency resource, and selecting a precoding matrix from a codebook of the base unit according to a predefined function based on indices received from the co-scheduled user units; and
a transmitting unit used for transmitting control information regarding the precoding matrix to each of the co-scheduled user units,
wherein each index of the indices representing a vector in a codebook of each of the co-scheduled user units, the predefined function is known to each of the co-scheduled user units, and the control information transmitted to each of the co-scheduled user units only contains information of the index from every other user unit of each of the co-scheduled user units.

19. A non-transitory computer readable medium including computer program codes for instructing a base unit to manage control information, the computer program codes comprising:
- instructions for co-scheduling two or more user units to share a time-frequency resource;
- instructions for selecting a precoding matrix from a codebook of the base unit according to a predefined function based on indices received from the co-scheduled user units; and
- instructions for transmitting control information regarding the precoding matrix to each of the co-scheduled user units, wherein each index of the indices representing a vector in a codebook of each of the co-scheduled user units,
- the predefined function is known to each of the co-scheduled user units, and
- the control information transmitted to each of the co-scheduled user units only contains information of the index from every other user unit of each of the co-scheduled user units.

20. A non-transitory computer readable medium including program codes for instructing a user unit to communicate with a base unit in a multi-user multi-input multi-output system, the program codes comprising:
- instructions for sending an index to the base unit, the index representing a vector in a codebook of the user unit; and
- instructions for receiving, from the base unit, control information regarding a precoding matrix related to a co-scheduled user unit, wherein
- a predefined function used by the base unit to select the precoding matrix according to the index sent by the user unit is known to the user unit, and the control information only contains information of another index sent to the base unit from the co-scheduled user unit.

* * * * *